(12) United States Patent
Eronen et al.

(10) Patent No.: US 9,588,968 B2
(45) Date of Patent: Mar. 7, 2017

(54) METHOD AND APPARATUS FOR ACQUIRING EVENT INFORMATION ON DEMAND

(75) Inventors: Antti Johannes Eronen, Tampere (FI); Juha Henrik Arrasvuori, Tampere (FI); Arto Juhani Lehtiniemi, Lempaala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 416 days.

(21) Appl. No.: 13/455,795

(22) Filed: Apr. 25, 2012

(65) Prior Publication Data
US 2013/0290359 A1    Oct. 31, 2013

(51) Int. Cl.
*G06F 17/30* (2006.01)
*G06Q 30/02* (2012.01)

(52) U.S. Cl.
CPC .......... *G06F 17/30* (2013.01); *G06F 17/3064* (2013.01); *G06F 17/30867* (2013.01); *G06Q 30/0207* (2013.01)

(58) Field of Classification Search
None
See application file for complete search history.

(56) References Cited

U.S. PATENT DOCUMENTS

| | | | |
|---|---|---|---|
| 2008/0176626 A1* | 7/2008 | Okada | G07F 17/32 463/19 |
| 2011/0231288 A1* | 9/2011 | Crisan | 705/27.1 |
| 2011/0294565 A1 | 12/2011 | Michelstein et al. | |
| 2013/0203475 A1* | 8/2013 | Kil | A63F 13/00 463/7 |

FOREIGN PATENT DOCUMENTS

| | | |
|---|---|---|
| KR | 10772762 B1 | 11/2007 |
| WO | WO 98/27491 A1 | 6/1998 |
| WO | WO 2007/035689 A2 | 3/2007 |
| WO | WO 2010/122216 A1 | 10/2010 |

OTHER PUBLICATIONS

Kuikkaniemi et al., "The Influence of Implicit and Explicit Biofeelback in First-Person Shooter Games", CHI 2010: Brains and Brawn, Apr. 2010, pp. 859-868, Atlanta, GA.

* cited by examiner

*Primary Examiner* — Miranda Huang
(74) *Attorney, Agent, or Firm* — Ditthavong & Steiner, P.C.

(57) ABSTRACT

An approach for enabling mobile device users to acquire information regarding events in their proximity on demand is described. An activity processing platform causes, at least in part, an aggregation of activity information associated with at least one device into at least one activity pool. The activity processing platform further processes and/or facilitates a processing of the at least one activity pool against one or more advancement criteria associated with one or more applications, one or more services, or a combination thereof to determine one or more recommendations with respect to the one or more applications, the one or more services, or a combination thereof.

20 Claims, 12 Drawing Sheets

100

306

300

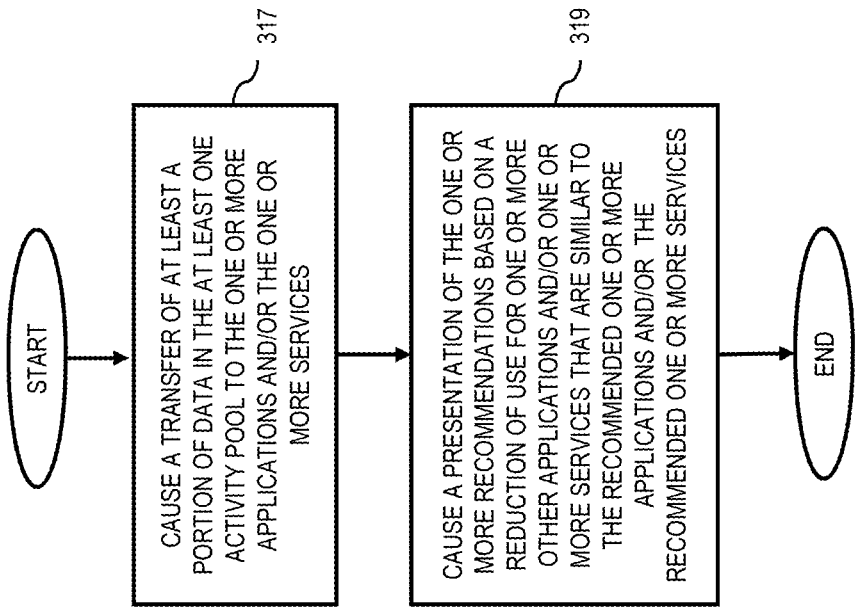
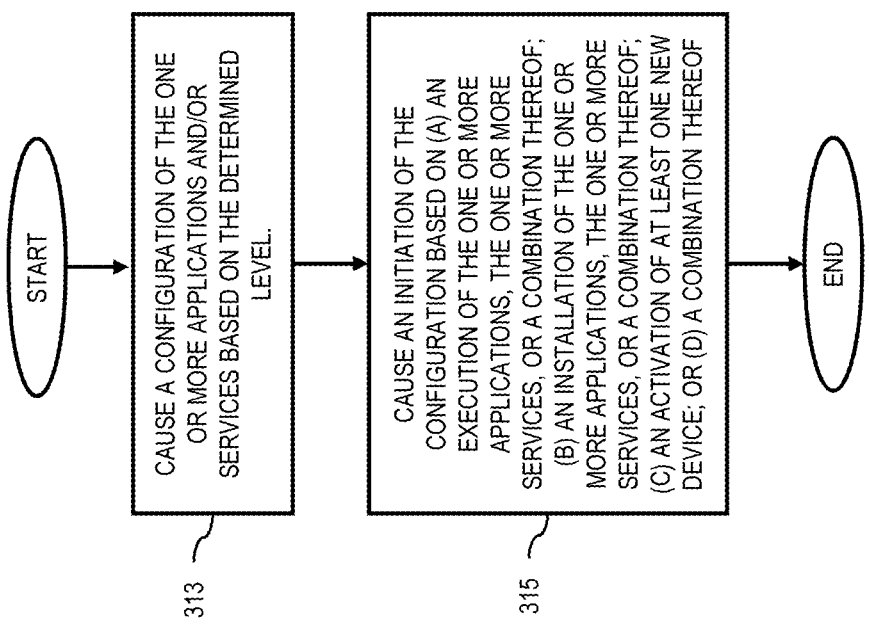

400

430

450

450

METHOD AND APPARATUS FOR ACQUIRING EVENT INFORMATION ON DEMAND

BACKGROUND

Service providers and device manufacturers (e.g., wireless, cellular, etc.) are continually challenged to deliver value and convenience to consumers by providing feature rich, contextually relevant applications and services. For example, many applications and services developed for mobile devices utilize current location information, activity information, temporal information and other real-time usage or contextual data to enable various functions and features. In certain instances, different levels of achievement may be attained by the user within the application or service (e.g., unlock an extra level, activate an incentive or benefit, receive activity points) based on the amount of use and interaction of the user with the application or service via the mobile device.

Unfortunately, the level attained can be lost when the application or service is accessed from a different device or upon initial registration of the service. This results in the user having to execute the application or service as if no prior advancement was achieved. Still further, lack of access to prior activity information regarding the application or service limits the ability of the service provided to identify and suggest other related applications or services having the same or similar achievement level criteria.

SOME EXAMPLE EMBODIMENTS

Therefore, there is a need for an approach for enabling mobile device users to aggregate activity information to determine advancement criteria for one or more services or applications.

According to one embodiment, a method comprises causing, at least in part, an aggregation of activity information associated with at least one device into at least one activity pool. The method further comprises processing and/or facilitating a processing of the at least one activity pool against one or more advancement criteria associated with one or more applications, one or more services, or a combination thereof to determine one or more recommendations with respect to the one or more applications, the one or more services, or a combination thereof.

According to another embodiment, an apparatus comprises at least one processor, and at least one memory including computer program code for one or more computer programs, the at least one memory and the computer program code configured to, with the at least one processor, cause, at least in part, an aggregation of activity information associated with at least one device into at least one activity pool. The apparatus is further caused to process and/or facilitate a processing of the at least one activity pool against one or more advancement criteria associated with one or more applications, one or more services, or a combination thereof to determine one or more recommendations with respect to the one or more applications, the one or more services, or a combination thereof.

According to another embodiment, a computer-readable storage medium carries one or more sequences of one or more instructions which, when executed by one or more processors, cause, at least in part, an apparatus to aggregate activity information associated with at least one device into at least one activity pool. The apparatus is further caused to process and/or facilitate a processing of the at least one activity pool against one or more advancement criteria associated with one or more applications, one or more services, or a combination thereof to determine one or more recommendations with respect to the one or more applications, the one or more services, or a combination thereof.

According to another embodiment, an apparatus comprises means for causing, at least in part, an aggregation of activity information associated with at least one device into at least one activity pool. The apparatus further comprises means for processing and/or facilitating a processing of the at least one activity pool against one or more advancement criteria associated with one or more applications, one or more services, or a combination thereof to determine one or more recommendations with respect to the one or more applications, the one or more services, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3A-3D are flowcharts of processes for aggregating activity information to determine advancement criteria for one or more services or applications of a mobile device, according to various embodiments;

DESCRIPTION OF SOME EMBODIMENTS

Examples of a method, apparatus, and computer program for aggregating activity information to determine advancement criteria for one or more services or applications of a mobile device, according to one embodiment are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
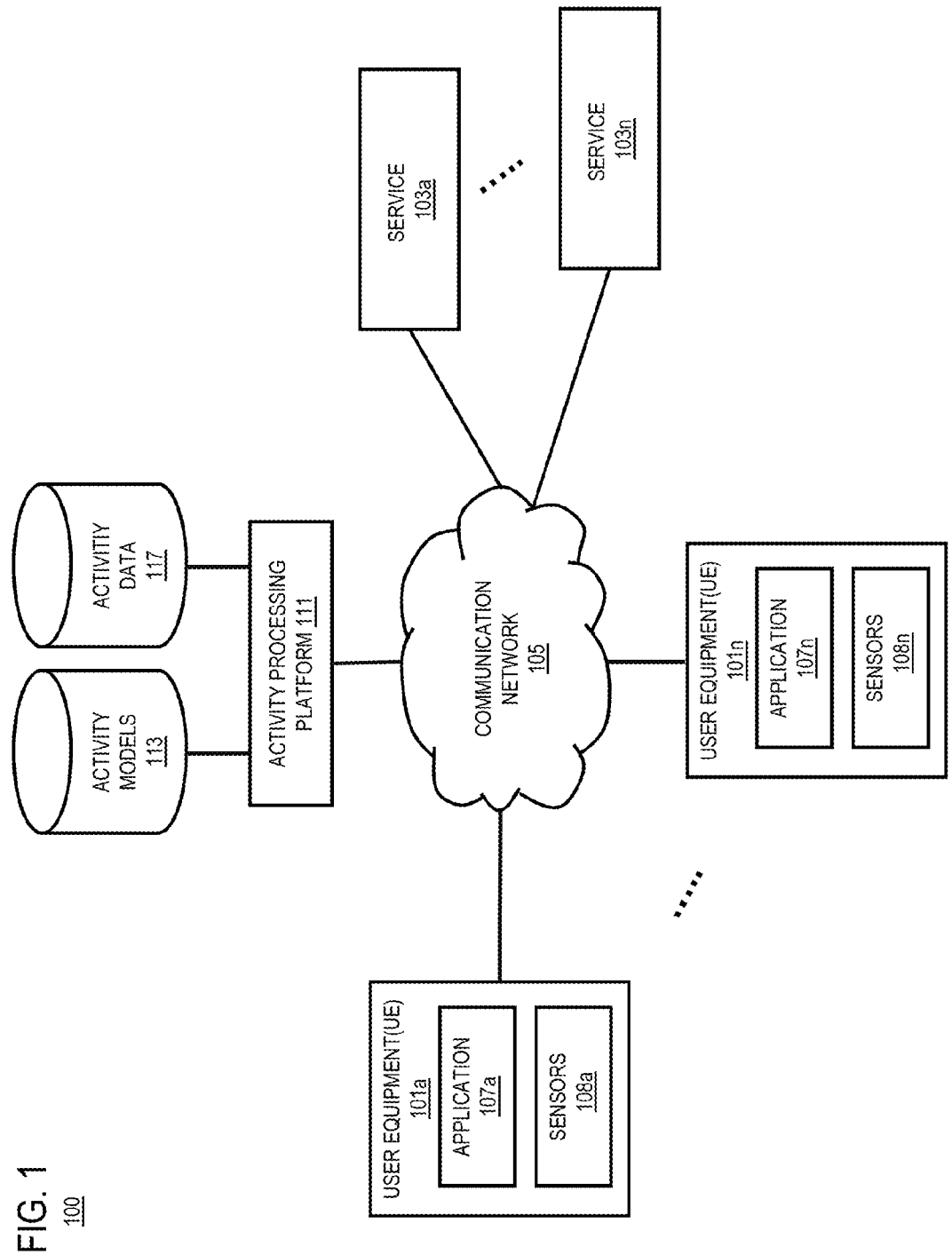
FIG. 1 is a diagram of a system capable of aggregating activity information to determine advancement criteria for one or more services or applications of a mobile device, according to one embodiment.

FIG. 1 is a diagram of a system capable of enabling mobile device users to aggregate activity information to determine advancement criteria for one or more services or applications, according to one embodiment. By way of example, an activity processing platform 111 is configured to operate in connection with a mobile device of a user, i.e., user equipment (UE) 101, to permit the accessing of a pool of activity information. In certain embodiments, the activity pool may include context information pertaining to the user, the UE 101, one or more other users, one or more other UE 101, or a combination thereof. In addition, the activity pool may house data for indicating a historical and/or current rate or amount of use of one or more applications, services, features of the UE 101, or a combination thereof by the user.

As noted previously, many applications and services developed for mobile devices utilize current location information, activity information, temporal information and other real-time interaction or contextual data to enable various functions and features. For example, certain location based services may be configured to track the current whereabouts and travels of a given mobile device user. In addition, the service may be configured to provide the user with incentives and offers based on their fulfilling of certain advancement criteria, such as their presence at a given location, a distance travelled, visiting of specific places, participation in specific events, associations and interactions with other users of the service, etc. All too often, however, the user of such services are forced to initiate the service as if they attained no level of advancement (e.g., from zero visits), particularly in instances where they are first registering or re-registering for the service.

This same phenomenon occurs with other context or interactive services and applications, including those for monitoring and logging exercise and/or workout activity. For example, upon installing and subsequently initiating such a tool (e.g., at the same or a new device), the service may indicate the user has performed no exercises, workouts or any other activities; this being indicated despite the user having logged years of activity information via another service. As in the prior scenario, there is currently no convenient solution for enabling activity information and/or associated achievement levels to be seamlessly aggregated and used for configuring applications and/or services at a mobile device. Furthermore, there is currently no convenient means of enabling the services, applications, device features, or like versions thereof, to be recommended to the user based on analysis of historical usage of the same or similar services, applications and/or device features.

To address this problem, a system 100 of FIG. 1 introduces the capability to automatically configure an application or service for execution at a prior attained level of achievement based on the aggregation of activity information related to a user, UE 101 associated with the user, various applications 107 and/or services 103 available to the user, or a combination thereof. For the purpose of illustration, activity information is maintained in a database referred to herein as an activity pool 117, and may include contextual information, application use information, service use information, device use information, or a combination thereof. Under this scenario, the activity pool 117 may house any data which may in whole or part, be processed by an activity processing platform 111 to determine a mode of use of one or more applications 107, services 103, or features of the UE 101, a level, rate, or amount of interaction between the user and one or more applications 107, services 103, or features of the UE 101, one or more trends pertaining to the use of one or more applications 107, services 103, or features of the UE 101, or a combination thereof. In certain embodiments, the activity processing platform 111 employs various analysis techniques to enable such results, including for example, processing the data according to one or more activity recognition techniques, algorithms and models 113.

By way of example, the activity processing platform 111 of system 100 performs one or more of the following: (1) persistently updates an activity pool related to a given user, UE 101a-101n, or a combination thereof with respect to the execution of one or more applications and/or services; (2) analyzes and process the activity pool 117, such as based on one or more models 113, to generate summary statistics for at least quantitatively determining usage of the one or more applications and/or services or interaction of the user with one or more features of the UE 101a-101n; (3) determines a correlation between the summary statistics and one or more criteria required for the user to attain a level of advancement associated with the one or more applications, the one or more services and/or one or more UE 101 features; (4) presents a recommendation at the UE 101 that includes information associated with the one or more applications, one or more services, or a combination thereof based on the determined correlation; (5) initiate, install or configure the one or more applications, the one or more services, the one or more features, or a combination thereof at a level of advancement corresponding to the criteria, the summary statistics, or a combination thereof; (6) determine a correlation between the summary statistics, the one or more applications, the one or more services, one or more members associated with the user of the UE 101, or a combination thereof for affecting configuring of the one or more application, the one or more services, the one or more features, or a combination thereof at a particular level of advancement or a combination thereof based on the historical activity information, the statistics, or a combination thereof.

In certain embodiments, the activity processing platform 111 determines the type of activity being performed by the user with respect to a given application 107a-107n or service 103a-103n executed via UE 101a-101n. As noted previously, the platform 111 maintains and analyzes the activity pool 117 in order to determine, among other things, an activity type associated with the user or the UE 101. In addition, the platform 111 determines device feature usage information, application use information, service use information, etc. By way of example, the activity processing platform 111 may process sensor data as gathered by sensors 108a-108n, application log data, activity log data and other data generated at a respective UE 101a-101n to determine whether a user is currently walking, running, or cycling, employing an application related to walking, running or cycling, employing various device features for tracking/monitoring data related to walking, running and cycling (e.g., pulse monitor, heart rate monitor, global positioning sensor), etc. As an example, the activity processing platform 111 may process accelerometer data captured by an accelerometer sensor at a UE 101a-101n to perform classification between different modes of physical activity (walking, running, driving a car, etc.). The classification between physical activities can be performed with any known feature extraction and pattern recognition methods applied on the accelerometer signal. In particular, in one embodiment the activity processing platform 111 performs classification of transportation mode by extracting mel-frequency cepstral coefficient features from the magnitude of the accelerometer signal. The activity processing platform may evaluate a likelihood of at least one Gaussian mixture model having generated the mel-frequency cepstral coefficients and determine the activity based on the likelihood. In this case, a Gaussian mixture model activity recognition model has been trained for different activities by collecting a number of accelerometer signal samples from different activities, performing mel-frequency cepstral coefficient feature extraction for each accelerometer sample, and training a Gaussian mixture model to model the distribution of mel-frequency feature vectors extracted from the samples corresponding to each activity. As another example, such an activity classification may be performed by a UE 101a-101n and information on the classified activity may be communicated to the activity processing platform 111. As another example, the platform 111 may log application usage and media playback statistics via the activity pool 117. This data is then analyzed subsequently to determine, for example, user activity corresponding to music listening, reading of digital content, web browsing, image capturing, document processing, etc. It is noted that any activity performed by the user or any interaction of the user with various sensors 108 and/or features of the UE 101 may be maintained.

In the examples described above, the sensor data collected by sensors 108a-108n of respective UE 101a-101n for aggregating the activity pool 117 may include data for indicating a position, speed, location, time, orientation, acceleration, or a combination thereof. Sensors 108a-108n for gathering of such data may include a gyroscope, a global positioning sensor, a temporal sensor, an accelerometer, or the like. In addition, application and service usage log data can be aggregated by the activity processing platform 111 by interfacing with different application programming interfaces (APIs) at the UE 101a-101n. The activity processing platform 111 may interface with the sensors 108 or APIs periodically or continually, depending on the requirements of the user. It is noted therefore that the activity pool 117 is collected and provided to the platform 111 for analysis based on one or more activity recognition algorithms or models 113. Hence, data from the activity pool 117 is provided as input to the algorithms or models 113 for enabling analysis.

In certain embodiments, the activity processing platform 111 analyzes the activity pool to generate one or more summary statistics. The summary statistics may include, for example, various metrics and/or values for indicating an amount, level or rate of use of one or more applications 107, one or more services 103 or one or more features of UE 101 (e.g., rate of use of sensors 108) by a given user. The summary statistics are therefore associated with a profile of a given user for characterizing the behavior, mode of use and/or interaction of the user with respect to the UE 101 or a given application and/or service. Table 1 depicts various exemplary summary statistics generated for a user. It is noted that the summary statistics will vary not only from one user to the next, but by device type, service provider type and the like.

TABLE 1

Amount of different physical activities performed (e.g., running, walking, driving a vehicle, cycling, skiing, roller skating, talking, etc.) as well as an amount of use of various sensors for monitoring such activities
Amount of visits to a particular location
Amount of participation with respect to a particular event and/or venue
Amount of music listened to as well as data for indicating the genre, category, artist, or title of music selections
Amount of pictures taken and/or sent to friends
Amount of messages sent & received as well as data indicating the messaging type and/or application used
Amount of use of various social networking services and corresponding features thereof
Amount of playing video games and achievements obtained in them (e.g. points, levels of advancement, titles, or virtual assets)
Amount of purchase transactions performed
Amount of use of any calling applications and/or services related to the above Of note, the statistics may be based on a compilation of data aggregated over a defined time period such as the course of a day, week, month, year, etc. For example, the statistics may be generated as a rate of X pictures taken per day. Also, in certain instances, the amount of a given activity can be measured over a defined distance, i.e., X messages sent per 100 miles travelled. In one embodiment, the summary statistics may be any suitable statistical measure which summarizes or otherwise characterizes a set of activity data obtained from users. Examples include, for instance, (a) measures of location or central tendency such as the arithmetic mean, geometric mean, median, mode, or interquartile mean; (b) measures of statistical dispersion such as standard deviation, variance, range, interquartile range, absolute deviation; and/or (c) measures of the shape of a distribution like skewness or kurtosis.

In certain embodiments, the activity processing platform 111 performs a comparison between the summary statistics compiled for a given user against criteria required for the user to attain a level of advancement associated with one or more applications, one or more services, or a combination thereof. The criteria may include an activity type, an application type, a service type, a rate of usage, an amount of usage, a location, a venue type, or a combination thereof. Hence, the activity processing platform 111 identifies those services and/or applications whose criteria for advancement matches up with or is fulfilled by the summary statistics associated with the user.

In certain embodiments, different levels of achievement for a particular application and/or service may correspond to the advancing of the user to a successive level within the application and/or service. In addition, the level of achievement may correspond to the accumulation or activation of one or more benefits, incentives, or the like, such as unlocking of a bonus level within a game, activating of a discount, accumulation of activity points, etc. By way of example, a sports activity game may have requirements for advancing to different levels, including walking 10 km and 20 km to advance to levels 2 and 3 respectively while running 30 km to 40 km corresponds to advancement to levels 4 and 5 respectively. When the summary statistics for the user indicates an amount of walking of 60 km, the activity processing platform 111 determines the activity is a match with advancement to level 2 of the game.

In addition, the activity processing platform 111 may also perform translational requirement processing, therefore translating a particular summary statistic of a user into its equivalent or related value or rate for fulfillment of certain advancement criteria. For instance, in the above described scenario of the game, the activity processing platform 111 may determine that the 60 km of walking activity performed by the user is equivalent to or substantially related to the requirement of 40 km of running for advancement to level 5 of the game. As another example, an amount of points or incentives accumulated with respect to one application and/or service may be translated into an equivalent number of points or incentives for a different application and/or service. Of note, the translation may be performed based on various equivalency algorithms and/or values indicated by the provider of the various applications and/or services.

In certain embodiments, once a match is determined between the criteria and the summary statistics, the activity processing platform 111 generates a recommendation to the user regarding the activity, the application and/or service. For example, in the previous example, the activity processing platform 111 may observe that the user would have already advanced several levels in the identified sports activity game based on last week's walking performance. Thus, in this case, the recommendation may include a message for indicating the advancement potential of the user, one or more incentives available, etc.: "With the amount of running you have done during the last week, you would have advanced to level 5 already in our new sports activity service. Would you like to try the service now?"

The recommendation may also make reference to a contact or member of the user's social network that is also at a lower, same, or higher level in one or more applications and/or services. Under this scenario, the activity processing platform 111 determines a correlation between the statistics of the user and those for one or more other users associated with the user. For example, the recommendation may include a message for indicating the following: "Your friend John is already a Gold level member in Music Subscription Service X. With the amount of music you purchase per month, you'd be eligible to receive 20 free song downloads for you and him just by joining today." Under this scenario, the user and the associated user (e.g., friend) are related by way of their respective summary statistics as well as a common application and/or service affiliation (e.g., Music Subscription Service X).

Alternatively, the message may pertain to a different application and/or service—i.e., one not already employed by the user. For example, the recommendation message may read as follows: "With the amount of music you purchase per month, you'd already be a Premier level member with ACME Movie Streaming Service. This entitles you to 30% discounts on all on-demand movies." As another example, the message may be presented as: "With the amount of Punk Rock listening and jumping you have done during the last two weeks, you would already have earned the badge Master Pogo-er in our collaborative music service Blibify." In the latter example, the music genre/category as well as the activity type are used as variables to determine the users' qualifications and/or correlation with the Blibify music service. In addition to the recommended action, the recommendation message rendered to the user may include addition information such as incentive and offers, service and/or application description information, registration information, instructions, etc.

In certain embodiments, the activity processing platform 111 may maintain a list of services providers, respective applications and services associated with the services providers, and the various criteria associated therewith. The service providers may update the list periodically, such as via a registration procedure with the activity processing platform 111 or in conjunction with a partnership/data sharing arrangement with the provider of the activity processing platform 111. As such, the statistics of the user in the activity pool are automatically compared to level advancement criteria of various multi-user applications and games seamlessly, without requiring user intervention or user initiated searching. Alternatively, various search procedures may be executed for identifying applications and/or services via a communication network 105 based on the summary statistics.

Still further, the activity processing platform 111 may also provide an application programming interface (API) for the various services providers to access the activity pool 117 for use in configuring new UE 101 or for installing/reinstalling applications. For example, when a user buys a new UE 101 and begins the service activation process, the user may be prompted by the activity processing platform 111 to provide credentials for accessing the platform 111. The activity processing platform 111 then uses these credentials to permit the device to access the activity pool 117 and subsequently update, for example, the running statistics for the same or a different sports program available on the new UE 101. By way of this approach, the user is able to execute the same or different sports program in connection with the aggregated running statistics rather than with no statistics at all. It is noted that various data aggregation, data mining and data fetching methods may be employed for enabling the data to be provided to the new UE 101.

In certain embodiments, the activity processing platform 111 also enables the automated launching, installing or configuring of one or more applications, one or more services, or a combination thereof at a prior attained level of advancement. In addition, the platform 111 may enable one or more applications to be launched, installed or configured at a higher level of advancement depending on the activity pool 117 and subsequent summary statistics determined for the user. In the latter scenario, the past performance and use information of the user, obtained from the summary statistics of various activities, is used to update the user status to an advanced level immediately upon entry to the service or application. Hence, the summary statistics are correlated to the higher level of advancement, such that subsequent or first time initiation of the application results in the user being associated with the higher level accordingly. Similarly, summary statistics may be used to establish an existing advancement level of the user in response to a reinstall of an application and/or service, migration to a different UE 101, etc.

For example, in the case of a user activating a sports activity related service, the user may be readily promoted to level 5 rather than having to start from the very beginning of the service (e.g., as if no activity were ever logged for the user). Under this scenario, the summary statistics are determined to correlate to the higher level of advancement. Alternatively, the summary statistics may be analyzed to determine at least a prior level of advancement of the user or an update to the prior/current level of advancement of the user. By way of example, the user may receive various newly introduced incentives and/or offers associated with their current Level 3; thus requiring no update initiation on the part of the user. It is noted that this automated procedure may, optionally, be performed in conjunction with the processing of profile information maintained for the user. In this case, the profile information may be used to establish a prior level of advancement, while the summary statistics enable the updating of various incentives and offers.

As shown in FIG. 1, the system 100 comprises user equipment (UE) 101 having connectivity to the activity processing platform 111 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, activity processing platform 111 and various services 103*a*-103*n* communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
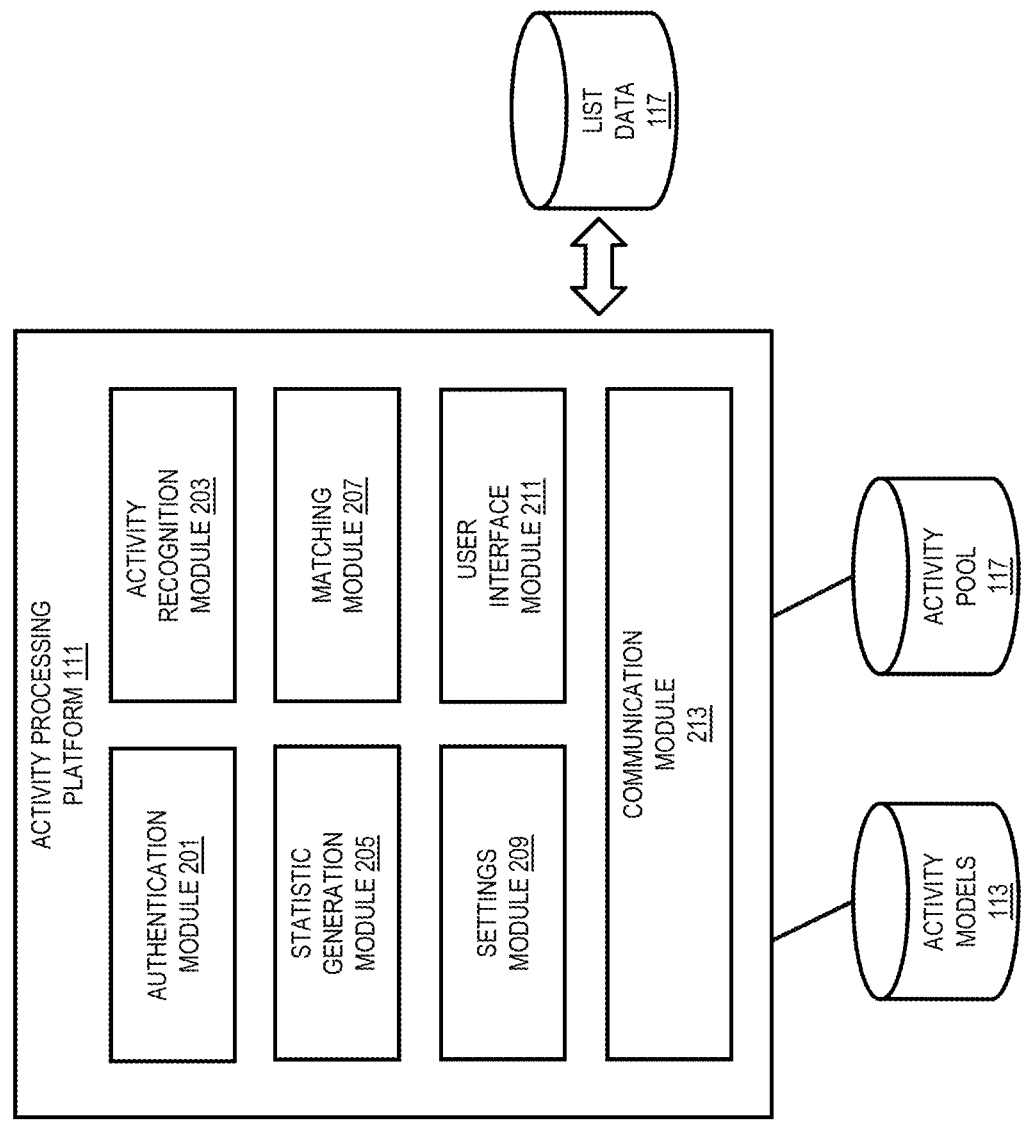
FIG. 2 is a diagram of the components of an activity processing platform, according to one embodiment.
Figure 3B:
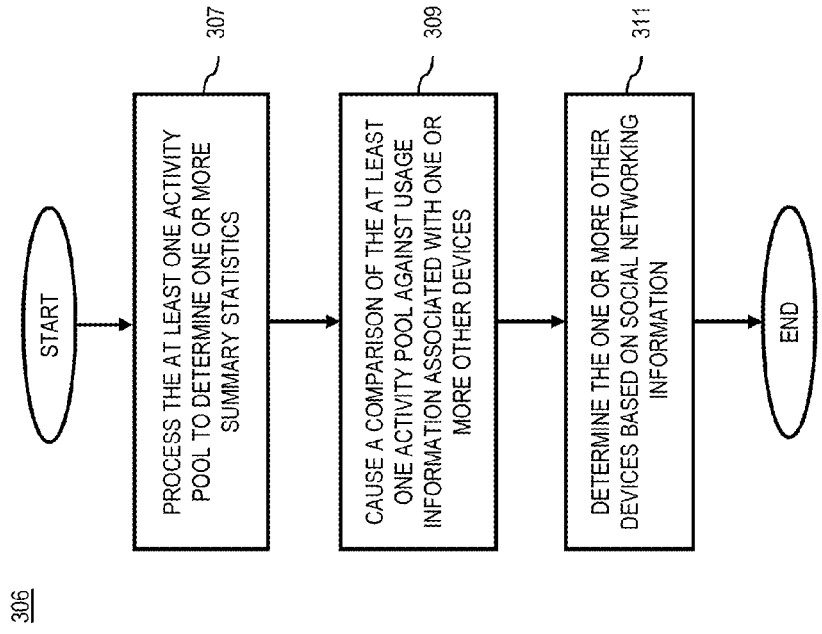
Figure 3A:
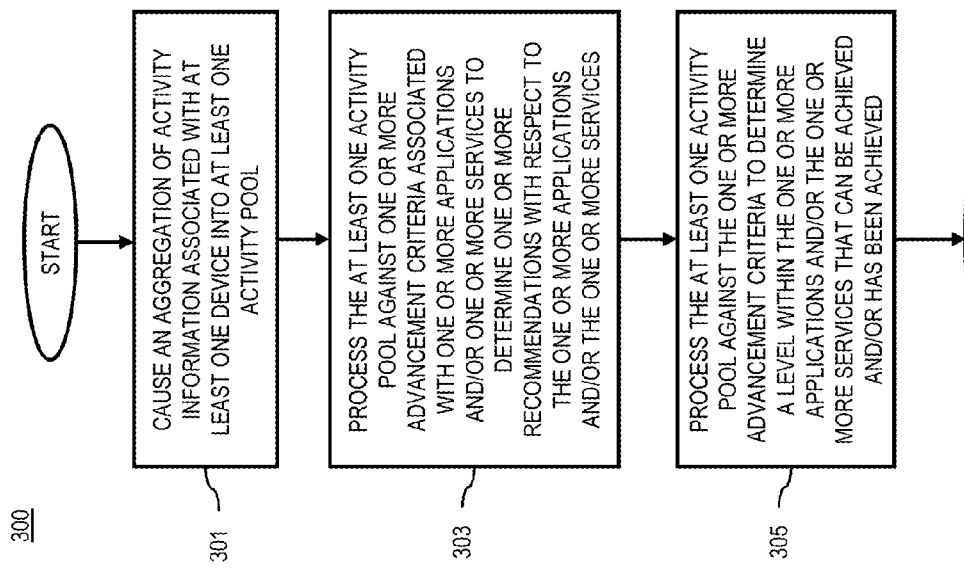

FIG. 2 is a diagram of the components of the activity processing platform, according to one embodiment. By way of example, the activity processing platform 111 includes one or more components for aggregating activity information to determine advancement criteria for one or more services or applications of a mobile device. It is contemplated that the functions of these components may be combined in one or more components or performed by other components of equivalent functionality. In this embodiment, the event determination platform 111 includes an authentication module 201, activity recognition module 203, statistic generation module 205, matching module 207, settings module 209, user interface module 211 and communication module 213.

The aforementioned modules 201-209 of the event determination platform 111 may also access one or more databases 113, 115 and 215 for performing various executions. This includes, for example, an activity models database 113 for storing one or more models or algorithms for recognizing activity information maintained in an activity pool 117. Also, a list database 215 may also be accessed for acquiring a list of criteria associated with one or more applications and/or one or more services. It is noted that a separate profile database (not shown) may be further associated with the various services 103 to which the user may be subscribed.

In one embodiment, an authentication module 201 authenticates users and user devices 101a-101n for interaction with the activity processing platform 111. By way of example, the authentication module 201 receives a request to subscribe to the activity processing platform 111 for enabling the identification and configuration of applications and services based on aggregated activity information for a user. The subscription process may include, for example, establishing one or more applications and/or services UE 101 is currently executing. One or more privacy settings and/or preferences may also be established, including a restriction on the sharing of details regarding content (e.g., music) consumed by the UE 101. Preferences and settings information may be referenced to a specific user, UE 101, or combination thereof, and maintained as profile data related to the user.

The authentication process performed by the module 201 may also include receiving and validating a login name and/or user identification value as provided or established for a particular user during a subscription or registration process with the service provider. In addition, the login name and/or user identifier may be received as credentials for permitting access of a requesting UE 101 to the activity pool 117 maintained in connection with a given user. The login name and/or user identification value may be received as input provided by the user from UE 101 or from another device via a graphical user interface to the platform 111 (e.g., as enabled by user interface module 211). Alternatively, the login process may be performed through automated association of profile settings maintained as registration data 217 with an IP address, a carrier detection signal of a user device, mobile directory number (MDN), subscriber identity module (SIM) (e.g., of a SIM card), radio frequency identifier (RFID) tag or other identifier.

The authentication module 201 may also be configured to login to various services to which a user is subscribed in response to the determining of a correlation between a given service and/or application and summary statistics generated for a user. Under this scenario, the authentication module 201 may cause execution of the user interface module 211 for executing the required application programming interfaces (APIs) that permit rendering and configuring of applications and/or services at an associated level of advancement.

In one embodiment, the activity recognition module 203 employs the activity models 113 to determine the type of activity performed by the user with respect to one or more features of the UE 101, one or more services, one or more applications, or a combination thereof. By way of example, the activity recognition module 203 performs context sensing and activity logging, and can be adapted to process activity information depending on the type of sensor employed to gather the activity information. For example, the activity recognition module 203 may process location data based on various location or distance determination algorithms while processing motion or movement data according to various position and/or orientation determination techniques. It is further noted that the activity recognition module 203 may be configured to discern a specific calling application or service associated with a given sensor type, such as for correlating a given sensor and/or feature of the UE 101 with the application and/or service.

In one embodiment, the activity recognition module 203 operates in connection with the statistics generation module 205 to determine one or more summary statistics related to a user. The summary statistics may be generated based, at least in part, on the determined activity type. The statistics may be generated in various forms for indicating usage of an application, a service, one or more features of a mobile device, or a combination thereof by a user of the mobile device. This may include statistics representing a rate of use, a mode of use, a usage context, or the like associated with a particular service and/or application. It is noted that the statistics may be generated based on the aggregation of the activity pool 117 over a given period of time. In certain instances, the statistic generation module 205 may trigger the accessing of activity information, sensor data, and the like by the activity recognition module 203 according to a predetermined frequency.

The statistic generation module 205 may also operate in connection with the matching module 207 to determine the various applications and/or services whose selection criteria match the aggregated summary statistics for the user. Under this scenario, the matching module retrieves information and/or accesses data regarding said applications and/or services from a list maintained in the list database 117. Alternatively, the matching module 207 may perform a search, via the communication network 105, for one or more applications and/or services that match the summary statistics.

Criteria for performing the match may include correlating the summary statistics against an activity type, an application type, a service type, a rate of usage, an amount of usage, a location, a venue type, or a combination thereof. In addition to identifying matching applications and/or services, the matching module 207 may further identify a level of advancement the user qualifies for based on the correlation between the summary statistics and the criteria. For example, the matching module 207 may identify that a number of points, a level of activity, a rate of use, etc., may be sufficient to correspond to a level of attainment within one or more services and/or applications. This may include performing translational processing, whereby an amount of activity, incentives, points or other quantified value for one application is translated into an equivalent amount of activity, incentives, points for a different application and/or service. Of note, the translation may be performed based on various equivalency algorithms and/or values indicated by the provider of the various applications and/or services, i.e., via the list data 117.

Still further, the matching module 207 may determine a match between the summary statistics of a user and that of one or more friends, acquaintances or other contacts affiliated with the user. Under this scenario, the matching module 207 may access a social networking service of which the user is registered to determine that the user and the other users are commonly affiliated with the same or similar applications and/or services. By way of this approach, recommendations may be generated for indicating the common association between the user and the one or more other users in addition to common activity type and application and/or service use.

Based on the matching, the module 207 may generate a recommendation for display to the user in conjunction with the user interface module 211. In certain embodiments, the user interface module 211 facilitates presentment of a graphical user interface for presenting event recommendations to the user in response to a determined correlation between the summary statistics and criteria for advancement for a given application and/or service. By way of example, the user interface module 211 generates the interface in response to application programming interfaces (APIs) or other function calls corresponding to the application 107 of UE 101a-101n; thus enabling the display of graphics primitives such as message prompts, buttons, data entry fields, etc. Also, the user interface module 211 facilitates the rendering of notification messages for conveying details regarding the various matching applications and/or services.

In certain embodiments, the settings module 209 may be configured to jumpstart (e.g., initialize or configure) the various matching applications and/or services. This includes those applications and/or services selected for activation by the user based on a provided recommendation. In addition, the settings module 209 enables automated configuration of an application and/or service based on a prior or higher attained level of advancement for the user in response to an initial installing or reinstalling of an application, i.e., activation of a new UE 101 for the user. By way of this approach, the past performance of the user, obtained from the summary statistics of various activities, is used to update the user status to the prior or advanced level immediately when the user enters the service. It is noted that this eliminates the need for the user to have to repeat the various activities corresponding to a certain level of advancement as the summary statistics are seamlessly integrated for use within the application and/or service.

Still further, the settings module 209 may operate in connection with the matching module 207 to provide an application programming interface (API) for providers of various applications and/or service to utilize the activity pool 117 of respective users. Under this approach, different device manufacturers or service providers may process the activity information to facilitate initialization, installation and/or configuration of new devices, services or applications at a corresponding level of advancement. By way of example, when a user buys a new mobile device (e.g., UE 101), the settings module 209 may call upon the authentication module 201 and user interface module 211 to facilitate the entry of access credentials, such as a username and password for the activity pool 117 data corresponding to the user. Once validated, by the authentication module 201, the settings module 209 accesses the pool and updates the activity information and statistics for the same or similar application type on the new mobile device.

In one embodiment, a communication module 213 enables formation of a session over a network 105 between the activity processing platform 111 and the services that maintain various registered event databases 115. By way of example, the communication module 213 executes various protocols and data sharing techniques for enabling collaborative execution between a subscriber's UE 101a-101n (e.g., mobile devices, laptops, smartphones, tablet computers, desktop computers) and the event determination platform 111 over the network 105. It is noted that the communication module 205 is also configured to support a browser session—i.e., the retrieval of content as referenced by a resource identifier during a specific period of time or usage of the browser. The browser session may support execution of a configuration interface for enabling a user to specify various settings for interacting with the event determination module 111 and their respective services (e.g., social networking services) they are subscribed to.

The above presented modules and components of the activity processing platform 111 can be implemented in hardware, firmware, software, or a combination thereof. Though depicted as a separate entity in FIG. 1, it is contemplated that the activity processing platform 111 may be implemented for direct operation by respective UEs 101a-101n. As such, the activity processing platform 103 may generate direct signal inputs by way of the operating system of the UE 101 for interacting with the application 107 and accessing services 103a-103n. In another embodiment, one or more of the modules 201-213 may be implemented for operation by respective UE 101a-101n as a platform 111 or hosted solution (e.g., cloud service), wherein the various applications and/or services determined to match summary statistics of a user are pulled from a host/cloud. Still further, the activity processing platform 111 may be integrated for direct operation with a service 103, such as in the form of a widget or applet, in accordance with an information and/or subscriber sharing arrangement. The various executions presented herein contemplate any and all arrangements.

Figure 6:
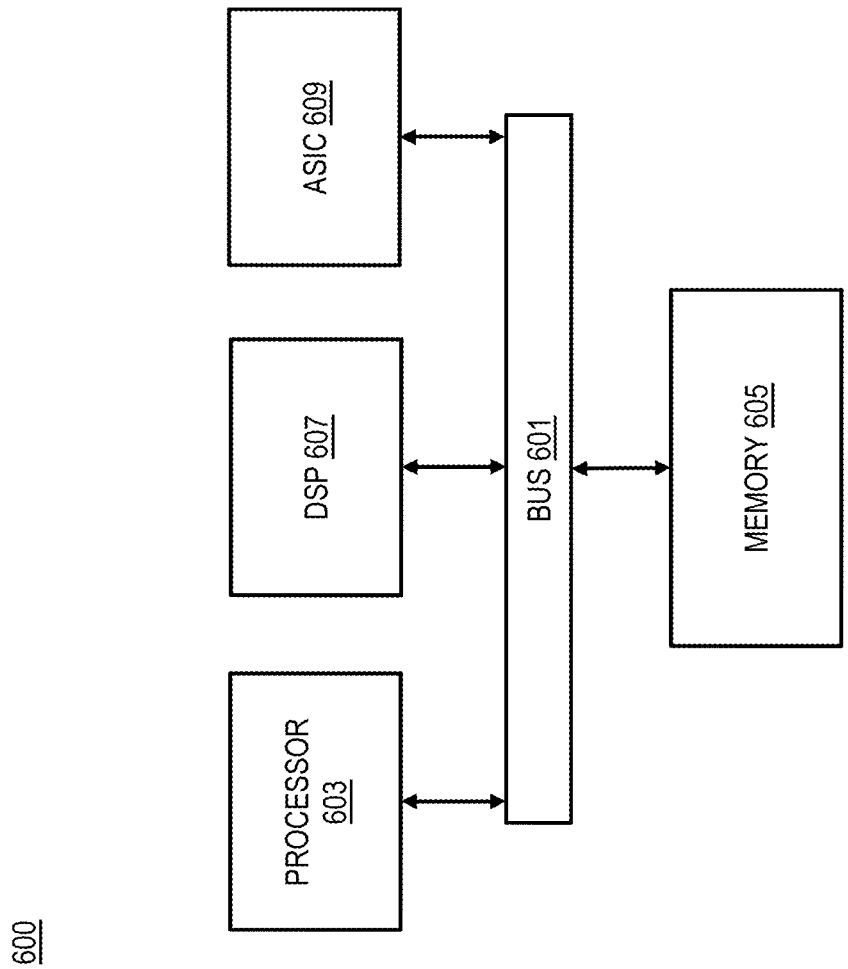
FIG. 6 is a diagram of a chip set that can be used to implement an embodiment of the invention.

FIGS. 3A-3D are flowcharts of processes for aggregating activity information to determine advancement criteria for one or more services or applications of a mobile device, according to various embodiments. In one embodiment, the activity processing platform 111 performs processes 300, 306, 312 and 316 and is implemented in, for instance, a chip set including a processor and a memory as shown in FIG. 6.

In step 301 of process 300 (FIG. 3A), the activity processing platform 111 causes an aggregation of activity information associated with at least one device into at least one activity pool. As noted previously, the activity information includes, at least in part, contextual information, application use information, service use information, device use information, sensor data, or a combination thereof. In step 303, the platform 111 processes the at least one activity pool against one or more advancement criteria associated with one or more applications and/or one or more services to determine one or more recommendations with respect to the one or more applications and/or the one or more services. The advancement criteria may be based on various factors, and may include for example, determining a rate or amount of usage of an application and/or service, a type or mode of usage of an application, service or device, a usage context (e.g., a location or venue type), or a combination thereof. Of note, the activity pool is processed against a list of applications and/or services or used to initiate a search procedure via a communication network. Per step 305, the platform 111 processes the at least one activity pool against the one or more advancement criteria to determine a level within the one or more applications and/or the one or more services that can be achieved and/or has been achieved.

In step 307 of process 306 (FIG. 3B), the activity processing platform 111 processes the at least one activity pool to determine one or more summary statistics. Of note, the one or more recommendations—i.e., for corresponding applications and/or services—are determined based, at least in part, on the one or more summary statistics. As noted previously, the summary statistics may include various metrics, values (e.g., ratios) determined based on aggregation of the activity pool of a user for a period of time. By way of example, the summary statistics may include data for indicating a rate or amount of use of an application, service, one or more features of a mobile device (e.g., sensors), or a combination thereof. It is further contemplated that a shared activity pool corresponding to multiple different users that interact with respect to a common application and/or service (e.g., a multi-player game) may also be accessed for determining group summary statistics. Under this scenario, the advancement of multiple associated users may be accounted for by the activity processing platform 111 for facilitating team and/or group advancement.

In step 309, the platform 111 causes a comparison of the at least one activity pool against usage information associated with one or more other devices. Of note, the usage information is based on that determined from the summary statistics, including a correlation between the summary statistics of different users. Per step 311, the platform 111 determines the one or more other devices based on social networking information. Hence, the one or more recommendations are based, at least in part, on the comparison, wherein the recommendation may include a message for detailing which other users within the social network correspond to the one or more devices. It is noted that the platform therefore enables a device user to identify how friends are advancing with respect to the applications and/or services being recommended.

In step 313 of process 312 (FIG. 3C), the application processing platform 111 causes a configuration of the one or more applications and/or services based on the determined level. By way of example, when it is determined from the summary statistics of the user, that a level of attainment has been previously achieved for an application and/or service; this level is automatically applied to the recommended application and/or service. In certain embodiments, this may include translating the prior achieved level to an equivalent level of attainment for the recommended application and/or service. Hence, points achieve for running activity totaling 5000 within a running based application may be translated into 3000 points for a travel based application. As another example, a Master Sergeant ranking in a first video game may translate to a Lieutenant General ranking for a second video game.

Per step 315, the platform 111 causes an initiation of the configuration based on (a) an execution of the one or more applications, the one or more services, or a combination thereof; (b) an installation of the one or more applications, the one or more services, or a combination thereof; (c) an activation of at least one new device; or (d) a combination thereof. Hence, the configuration is carried forth without any intervention required from the user or reestablishment by the user of new activity information.

In step 317 of process 316 (FIG. 3D), the activity processing platform 111 causes a transfer of at least a portion of data in the at least one activity pool to the one or more applications and/or the one or more services. Per step 319, the platform 111 causes a presentation of the one or more recommendations based on a reduction of use for one or more other applications and/or one or more services that are similar to the recommended one or more applications and/or the recommended one or more services. Hence, the platform 111 supports cross-functional and cross-genre application and/or service support; wherein applications and/or services having differing functional uses, contextual characteristics and/or market appeals may be aligned with one another to facilitate automated level advancement configuration and recommending thereof.

FIGS. 4A-4E are diagrams of user interfaces utilized in the processes of FIGS. 3A-3D, according to various embodiments. For the purpose of illustration, the diagrams are described with respect to an exemplary use case of a user interacting with the activity processing platform 111 via a mobile device 400 having access to one or more application and/or services.

Figure 4A:
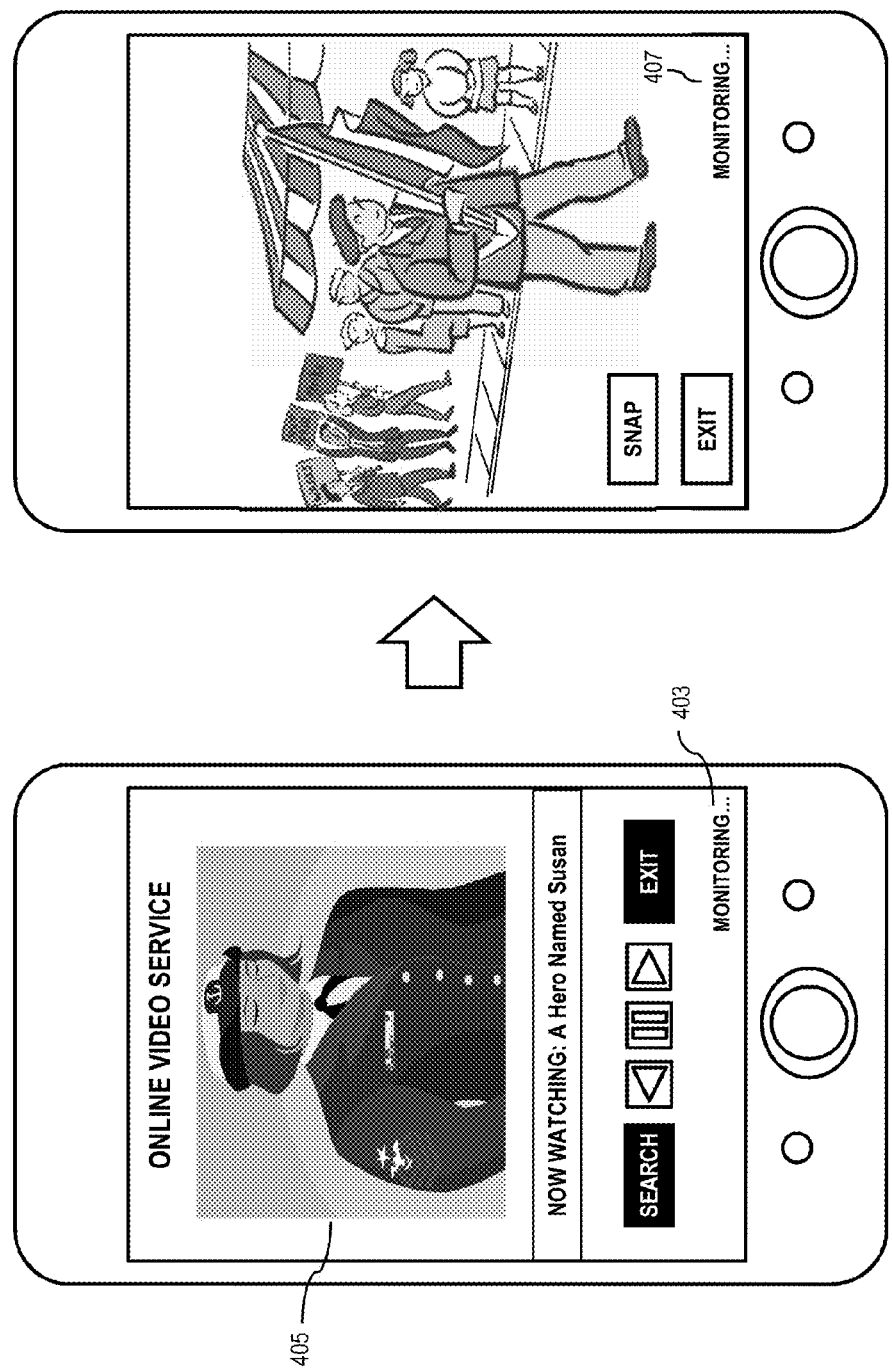
FIGS. 4A-4E are diagrams of user interfaces utilized in the processes of FIGS. 3A-3D, according to various embodiments.

In FIG. 4A, the activity processing platform 111 gathers activity information and associated context information for aggregating the activity pool of a user as the user employs various applications and/or services. In this example, the activity processing platform 111 collects activity information as the user accesses an online video service via a communication network. The monitoring action is indicated to the user by way of a notification prompt 403 that reads "MONITORING," which occurs concurrent with execution of the service (optional). Activity and context information gathered for aggregation of the pool may include temporal information such as the amount of time spent viewing movies, a frequency of movie viewing, details regarding the movie (e.g., genre, category, rating, director, originating movie studio), location information corresponding to viewing of a movie, context information for indicating the current environment of the user (e.g., a friend's home), etc. Still further, information regarding the various sensors or features of the device used to execute the service—i.e., a network detection sensor and light sensor—may also be compiled for generating the activity pool. It is noted that the activity information is gathered conspicuously, without causing interruption of the movie 405.

At a later time, activity information and corresponding context information is aggregated in connection with the execution of a camera application of the mobile device 400. As in the above example, a notification prompt 407 indicates that data is being monitored. It is noted that the monitoring activity of the activity processing platform 111 may be performed for a period of time established by the user or in accordance with a default period of time.

Once the activity pool is generated, the activity processing platform 111 generates summary statistics for characterizing the use of the mobile device, the various applications and/or services associated therewith, the various features of the mobile device, the activity types associated with use of the applications and/or services, etc. Still further, the summary statistics are then used to identify one or more applications and/or services having criteria for advancement that corresponds to the summary statistics as determined for the user. The summary statistics may also be used to identify one or more associated users, such as members of a common social network, whose summary statistics, application and/ or service use, or the like correspond to that of the user. More regarding these characteristics is discussed later on herein.

Figure 4B:
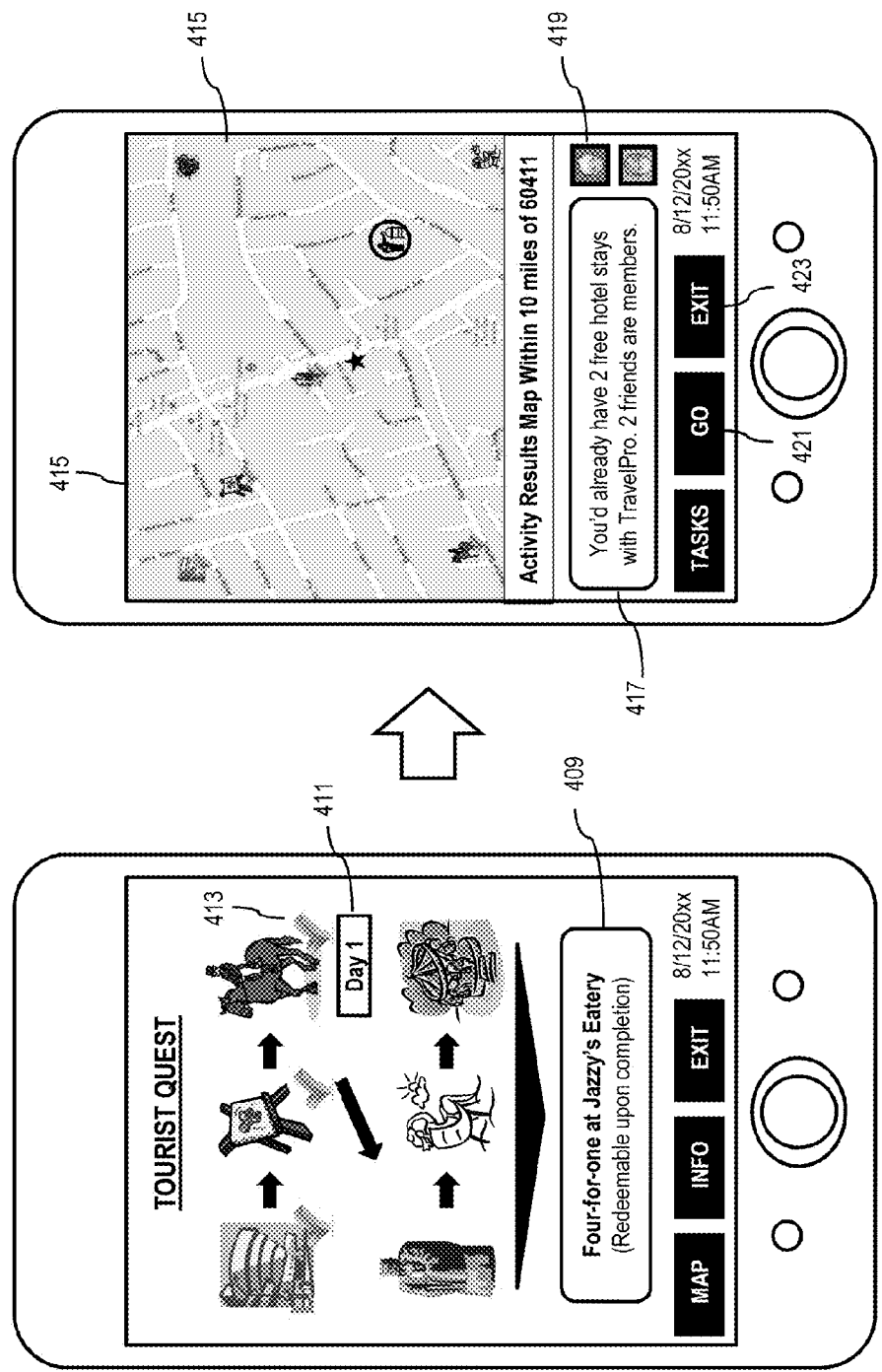

In FIG. 4B, the user employs a tourist service that employs various location based services to enable is various functions. By way of example, the tourist service tracks and monitors the travels of a user as they visit various venues recommended by the service according to a particular order. Successful completion of visits to the recommended locations, according to the specified sequence, within a defined period of time unlocks an incentive or offer for the user. In this case, the incentive 409 corresponds to a discounted restaurant visit. Under this scenario, the user successfully visits several of the recommended venues/sites on a first day labeled Day 1 411, with completion being indicated by a checkmark (e.g., 413) at a corresponding venue. The user then retires for the day, with plans to complete the rest of the journey the next day. Unfortunately, the next day, the mobile device 400 experiences a technical malfunction that requires the user to reset the device to its original settings; prior to activating of the tourist service for execution at the mobile device 400 (e.g., installation of a corresponding application that interacts with the service).

Rather than requiring the user to revisit the various venues upon reactivation of the tourist service, the activity processing platform 111 accesses the activity pool of the user to automatically configure the corresponding application, i.e., based on the summary statistics. Hence, the statistics related to the user are used to update the application to the prior attained level of advancement immediately upon entry. Under this example, the venues corresponding to Day 1 as well as any associated benefits are readily reduced to practice.

Still further, at a later time of use of the application corresponding to a map view 415, the user is presented with a notification message 417 for presenting a recommendation for a different but related application and/or service. The recommendation 417 is generated in response to a determination of a match between the determined summary statistics for the user relative to the tourist service and various other applications and/or services whose criteria correlate to the statistics. By way of example, therefore, the message 417 indicates the user is eligible for benefits—i.e., corresponding to their particular level of advancement within the travel service—for switching to a different travel service called TravelPro).

In addition to generating recommendations based on applications and/or services having matching level advancement criteria or the like, the recommendation 417 may also make reference to one or more members of a social network of the user. Under this scenario, the summary statistics generated for the user are compared to those generated for the other users to determine a similarity in application and/or service use, one or more common or related levels of advancement, etc. The recommendation message 417 in this case indicates that two members of the user's social network are already members of the recommended alternative travel service. In addition, avatars such as avatar 419 for representing the various members are presented to the display 414 as well.

It is noted that reference to the various members of the user's social network may serve as a further incentive and/or enticement for the user to take advantage of the recommendation. Under this scenario, the user may respond affirmatively to the recommendation message 417 by selecting a GO action button 421 or reject the recommendation by selecting the EXIT action button 423.

Figure 4C:
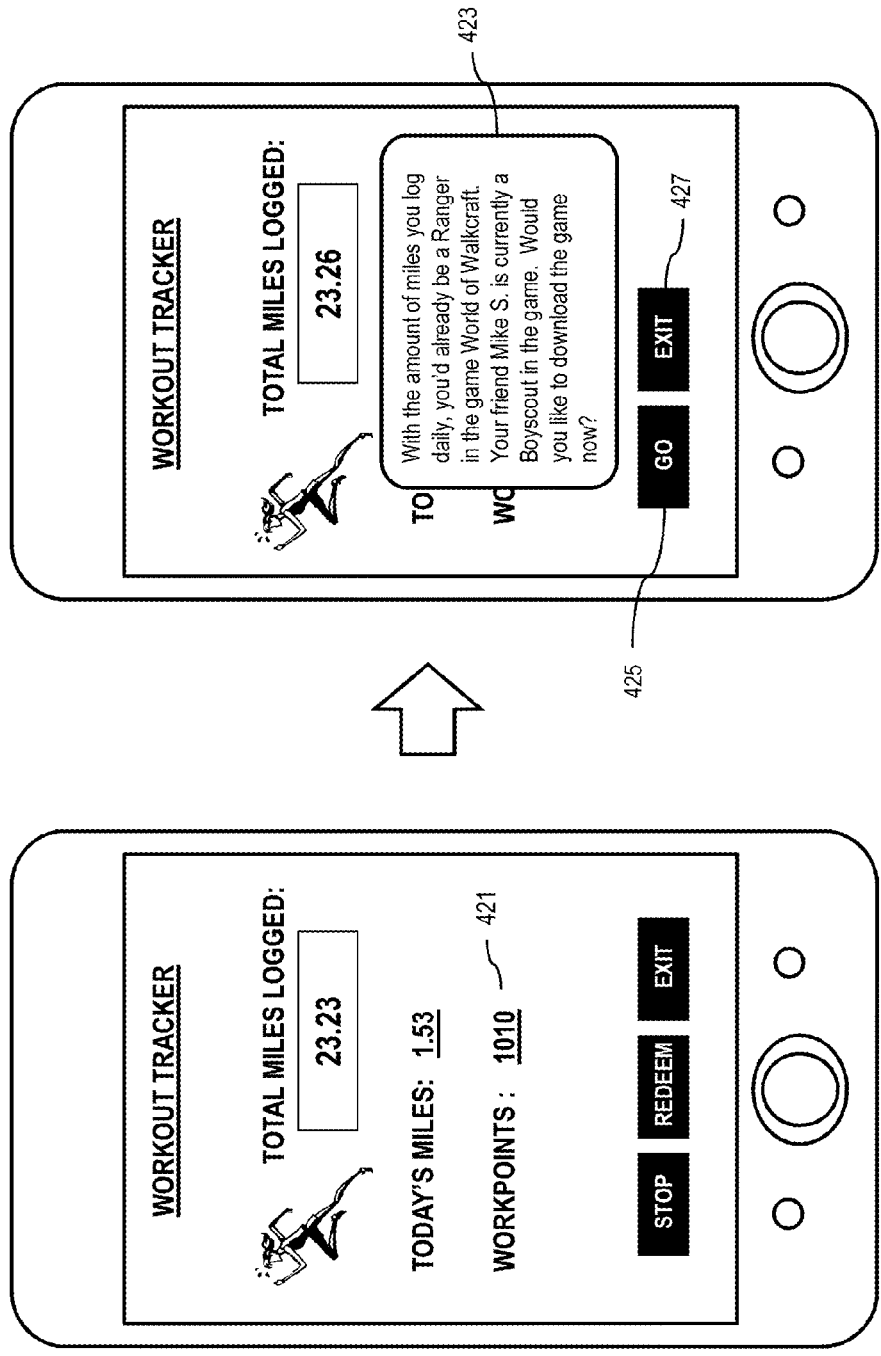

In FIG. 4C, the user is shown to employ a workout tracking application, which allows the user to accumulate points (Workpoints) based on a number of miles travelled. Under this scenario, having generated the summary statistics with respect to this application, it is determined the user would have already advanced several levels in a game whose criteria corresponds to the summary statistics. Hence, a recommendation message 423 is generated by the activity processing platform 111 that indicates the following: "With the amount of miles you log daily, you'd already be a Ranger in the game World of Walkcraft. Your friend Mike S. is currently a Boyscout in the game. Would you like to download the game now?"

As noted above, the recommendation message 423 makes reference to a member of the user's social network as well as that member's corresponding level within the recommended application. Furthermore, the application makes reference to a specific level of advancement within the recommended application that the user may qualify for immediately if they were to perform the download. It is noted that the Workpoints 421 may be determined to correspond to the recommended level of advancement (e.g., Ranger within World of Walkcraft) based on various correlation factors and other criteria. Among these, the platform 111 may also process the Workpoints 421 of the workout tracking application for translation to an equivalent value with respect to the recommended game.

In this case, the user may respond to the recommendation by selecting the GO action button to initiate downloading of the recommended application. Alternatively, the user may select the EXIT action button 427 to cancel the message and resume use of the workout tracking application. While not shown, additional recommendation messages corresponding to various other qualifying applications and/or services may also presented to the user. It is further contemplated that the qualifying applications may also be presented in the form of a list for enabling user selection of a particular application, a particular associated level of advancement, or a combination thereof.

Figure 4D:
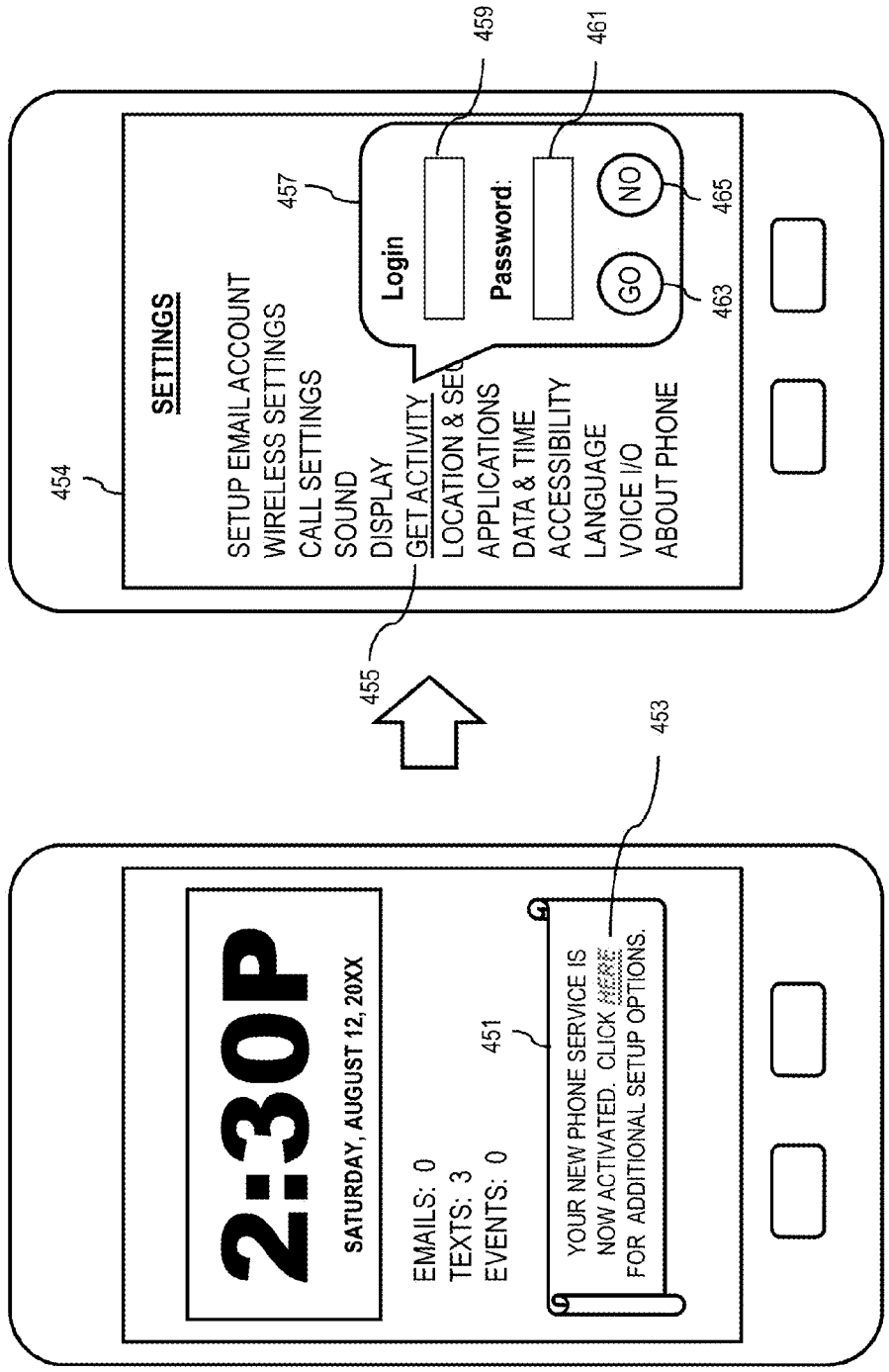

In FIG. 4D, a mobile device accesses an activity pool for the user to enable automated configuration of one or more applications and/or services. Under this scenario, the configuration is performed in connection with the initial activation of a new mobile device 450 of the user. For the purpose of illustration, the new mobile device 450 is a different model of phone related to the same user who owned mobile phone 400.

Per this initial activation, a setup message 451 is presented wherein the user is given the option to activate a link 453 for launching a settings view 454 of the new mobile device 450. The settings view 454 enables the user to select from various categories of settings options to configure, and per the activity processing platform 111, includes a GET ACTIVITY settings option 455. The GET ACTIVITY settings option 455 enables the user to login to the activity processing platform 111 via the new phone 450 for accessing the various data maintained in the activity pool for the for user. Under this scenario, the activity pool may be used to configure the same or similar applications and services of the new device 450 with the same or equivalent level of advancement as the user's prior mobile device (e.g., mobile device 400).

Upon selecting the GET ACTIVITY settings option 455, the user is presented with a dialogue prompt 457 for enabling the user to enter various activity processing platform 111 credentials. This includes, for example, a data entry field 459 for receiving a login name as well as another data entry field 461 or receiving a password. The user may cancel the data entry process by selecting the NO action button 465. Alternatively, the user may select the GO action button 463 to initiate contact with the platform 111 based on the credentials entered at fields 459 and 461. In the case of the workout tracking application on the prior mobile phone 430 (e.g., FIG. 4C) for example, the same or similar workout tracking application at the new device 450 may be updated such that the accumulated Workpoints are shown at the new mobile device 450.

It is noted in the above example that the application processing platform 111 may, in certain embodiments, provide an application programming interface (API) for providers of applications, services and mobile devices to access the activity pool in the manner described. By way of this approach, any device manufacturer, software developer or service providers can readily access relevant activity pool data for use in connection with any device of a user.

Figure 4E:
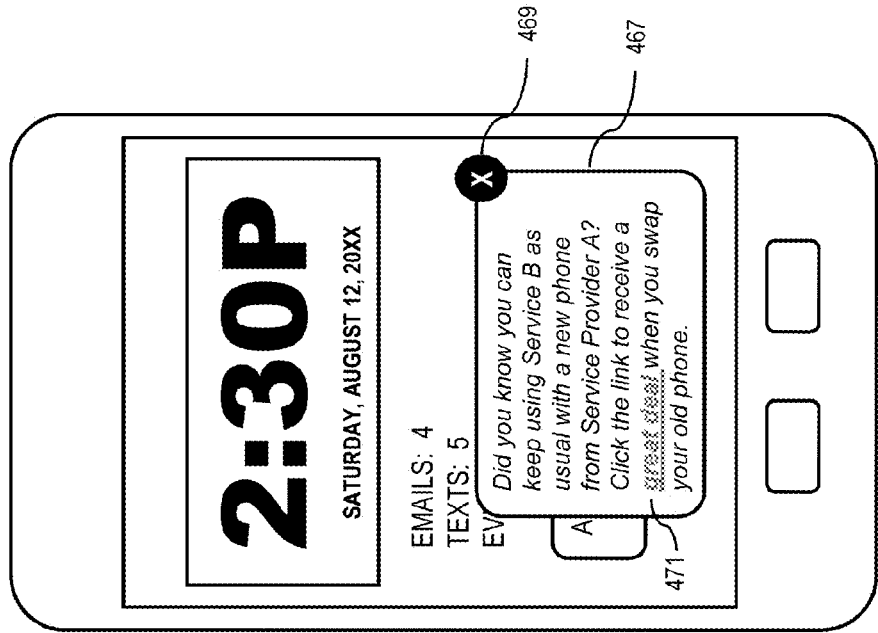

In FIG. 4E, the activity processing platform 111 facilitates the generation of recommendation messages pertaining to the changing of service providers and/or their associated products. This is depicted, for example, in FIG. 4E by way of a recommendation message 467, which reads as follows: "Did you know you can keep using Service B as usual with a new phone from Service Provider A? Click the link to receive a great deal when you swap your old phone." Under this scenario, the message 467 is intended to encourage a device switch to Service Provider A, wherein the activity pool data can be readily transferred to the new service. The use may reject the recommendation by selecting a close button 469 or accept the offer by activating a link 471.

In the case where the link is activated 471 to initiate the purchase and/or configuring of a new device via Service Provider A, the activity processing platform 111 enables migration of the various settings and/or advancement levels of relevant applications to the new device. As a result, when the user first activates the new device, the various applications of the new device that are indicated with respect to the activity pool are configured for reduction to practice in the same manner as the prior device.

The processes described herein for enabling mobile device users to aggregate activity information to determine advancement criteria for one or more services or applications may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 5:
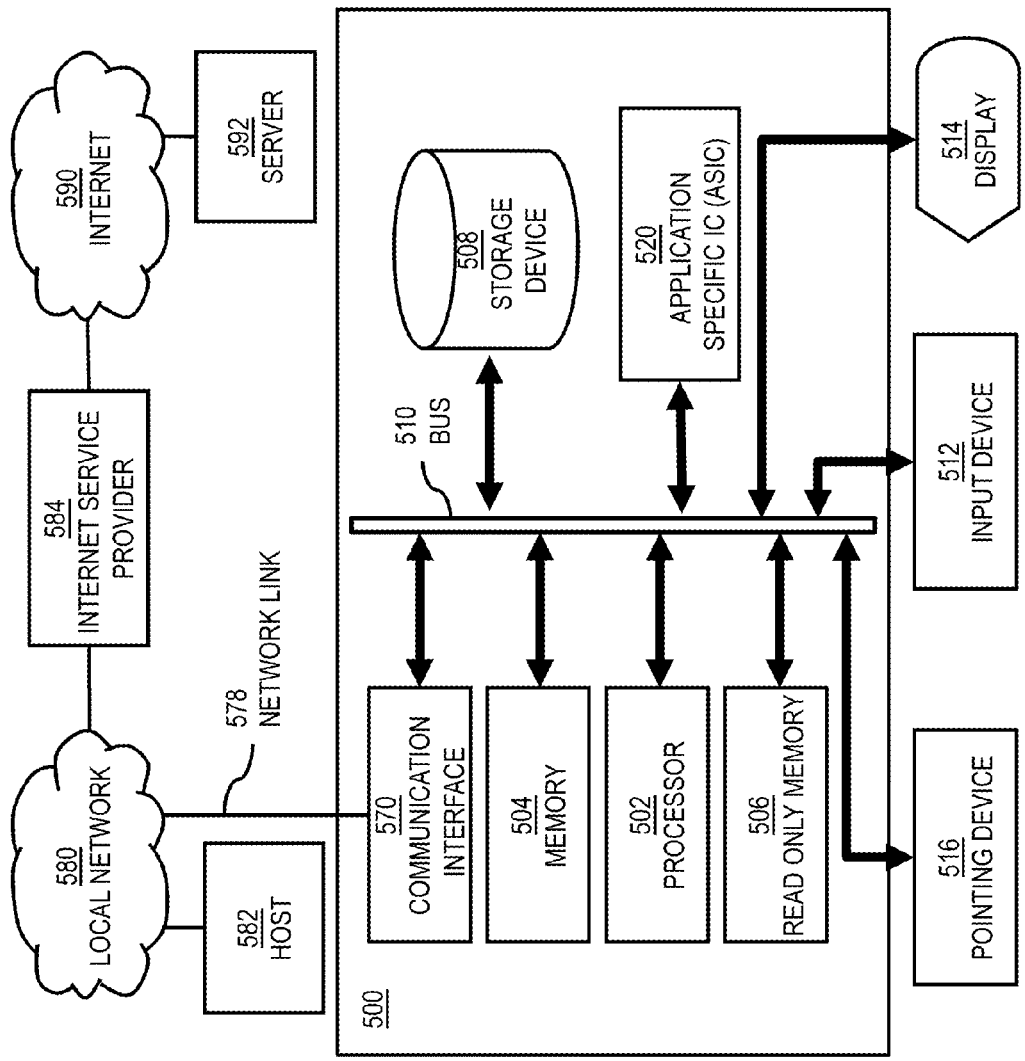
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to enable mobile device users to aggregate activity information to determine advancement criteria for one or more services or applications as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of enabling mobile device users to aggregate activity information to determine advancement criteria for one or more services or applications.

A bus 510 includes one or more parallel conductors of information so that information is transferred quickly among devices coupled to the bus 510. One or more processors 502 for processing information are coupled with the bus 510.

A processor (or multiple processors) 502 performs a set of operations on information as specified by computer program code related to enable mobile device users to aggregate activity information to determine advancement criteria for one or more services or applications. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or any other dynamic storage device, stores information including processor instructions for enabling mobile device users to aggregate activity information to determine advancement criteria for one or more services or applications. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or any other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for enabling mobile device users to aggregate activity information to determine advancement criteria for one or more services or applications, is provided to the bus 510 for use by the processor from an external input device 512, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT), a liquid crystal display (LCD), a light emitting diode (LED) display, an organic LED (OLED) display, a plasma screen, or a printer for presenting text or images, and a pointing device 516, such as a mouse, a trackball, cursor direction keys, or a motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of ASICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for enabling mobile device users to aggregate activity information to determine advancement criteria for one or more services or applications to the UE 101.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or any other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

FIG. 6 illustrates a chip set or chip 600 upon which an embodiment of the invention may be implemented. Chip set 600 is programmed to enable mobile device users to aggregate activity information to determine advancement criteria for one or more services or applications as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps of enabling mobile device users to aggregate activity information to determine advancement criteria for one or more services or applications.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to enable mobile device users to aggregate activity information to determine advancement criteria for one or more services or applications. The memory 605 also stores the data associated with or generated by the execution of the inventive steps.

Figure 7:
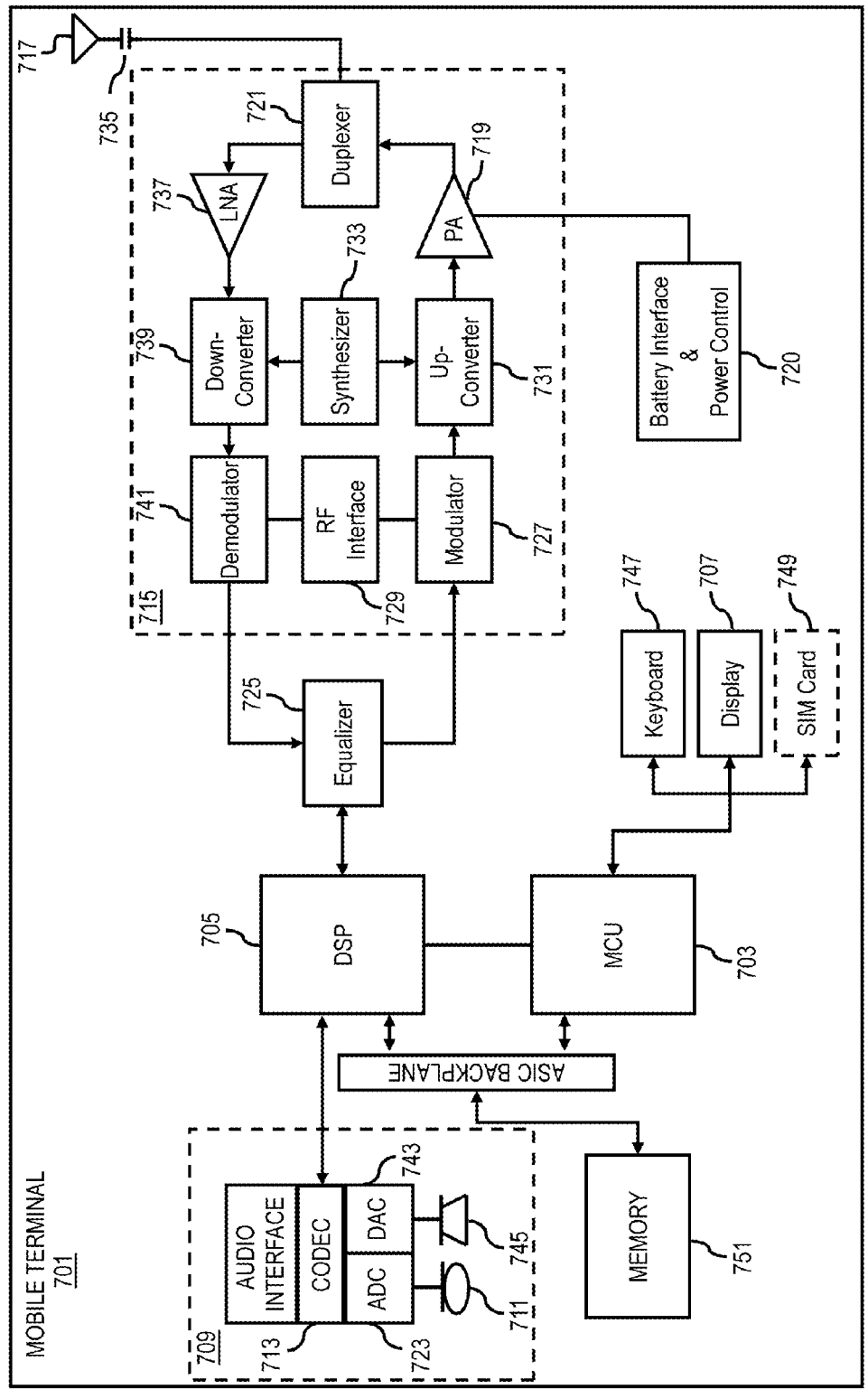
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 701, or a portion thereof, constitutes a means for performing one or more steps of enabling mobile device users to aggregate activity information to determine advancement criteria for one or more services or applications. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of enabling mobile device users to aggregate activity information to determine advancement criteria for one or more services or applications. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703 which can be implemented as a Central Processing Unit (CPU).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to enable mobile device users to aggregate activity information to determine advancement criteria for one or more services or applications. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:

causing, at least in part, an aggregation of user physical activity information associated with at least one device of a given user into at least one activity pool for the given user, a processing of the at least one activity pool against one or more advancement criteria associated with one or more applications, one or more services, or a combination thereof by comparing the at least one activity pool to the one or more advancement criteria associated with the one or more applications, the one or more services, or the combination thereof, to determine a level of advancement, of a plurality of different levels of advancement, within the one or more applications, the one or more services, or a combination thereof that would be achieved by the user based on the aggregated activity information;

causing, at least in part, one or more recommendations to the user to use the one or more applications, the one or more services, or the combination thereof based on the determined level of advancement and execution, for a first time by the device for the user, of the one or more applications, the one or more services, or combination thereof for the user at the determined level of advancement.

2. The method of claim 1, wherein the (1) data and/or (2) information and/or (3) at least one signal are further based, at least in part, on the following:

a processing of the at least one activity pool to determine one or more summary statistics, wherein the one or more summary statistics comprises amount of each physical activity performed, and wherein the one or more recommendations are determined based, at least in part, on the one or more summary statistics.

3. The method of claim 1, wherein the (1) data and/or (2) information and/or (3) at least one signal are further based, at least in part, on the following:

a comparison of the at least one activity pool against usage information associated with one or more other devices, wherein the one or more recommendations are further based, at least in part, on the comparison.

4. The method of claim 1, wherein the (1) data and/or (2) information and/or (3) at least one signal are further based, at least in part, on the following:

at least one determination of one or more other devices based, at least in part, on social networking information.

5. The method of claim 1, wherein the (1) data and/or (2) information and/or (3) at least one signal are further based, at least in part, on the following:

an initiation of the configuration based, at least in part, on (a) an execution of the one or more applications, the one or more services, or a combination thereof; (b) an installation of the one or more applications, the one or more services, or a combination thereof; (c) an activation of at least one new device; or (d) a combination thereof.

6. The method of claim 5, wherein the (1) data and/or (2) information and/or (3) at least one signal are further based, at least in part, on the following:

a transfer of at least a portion of data in the at least one activity pool to the one or more applications, the one or more services, or a combination thereof.

7. The method of claim 1, wherein the (1) data and/or (2) information and/or (3) at least one signal are further based, at least in part, on the following:

a presentation of the one or more recommendations based, at least in part, on a reduction of use for one or more other applications, one or more services, or a combination thereof that are similar to the recommended one or more applications, the recommended one or more services, or a combination thereof.

8. The method of claim 1, wherein the activity information includes, at least in part, contextual information, application use information, service use information, device use information, sensor data, or a combination thereof.

9. An apparatus comprising:

at least one processor; and at least one memory including computer program code for one or more programs, the at least one memory and the computer program code configured to, with the at least one processor, cause the apparatus to perform at least the following, cause, at least in part, an aggregation of user physical activity information associated with at least one device of a given user into at least one activity pool for the given user, process and/or facilitate a processing of the at least one activity pool against one or more advancement criteria associated with one or more applications, one or more services, or a combination thereof by comparing the at least one activity pool to the one or more advancement criteria associated with the one or more applications, the one or more services, or the combination thereof, to determine a level of advancement, of a plurality of different levels of advancement, within the one or more applications, the one or more services, or a combination thereof that would have been achieved by the user based on the aggregated activity information;

causing, at least in part, one or more recommendations to the user to use the one or more applications, the one or more services, or the combination thereof based on the determined level of advancement; and execution, for a first time by the device for the user, of the one or more applications, the one or more services, or combination thereof for the user at the determined level of advancement.

10. The apparatus of claim 9, wherein the apparatus is further caused to:

process and/or facilitate a processing of the at least one activity pool to determine one or more summary statistics, wherein the one or more summary statistics comprises amount of each physical activity performed, and wherein the one or more recommendations are determined based, at least in part, on the one or more summary statistics.

11. The apparatus of claim 9, wherein the apparatus is further caused to:

cause, at least in part, a comparison of the at least one activity pool against usage information associated with one or more other devices, wherein the one or more recommendations are further based, at least in part, on the comparison.

12. The apparatus of claim 11, wherein the apparatus is further caused to:

determine the one or more other devices based, at least in part, on social networking information.

13. The apparatus of claim 9, wherein the apparatus is further caused to:

cause, at least in part, an initiation of the configuration based, at least in part, on (a) an execution of the one or more applications, the one or more services, or a combination thereof; (b) an installation of the one or more applications, the one or more services, or a combination thereof (c) an activation of at least one new device; or (d) a combination thereof.

14. The apparatus of claim 9, wherein the apparatus is further caused to:
   cause, at least in part, a transfer of at least a portion of data in the at least one activity pool to the one or more applications, the one or more services, or a combination thereof.

15. The apparatus of claim 9, wherein the apparatus is further caused to:
   cause, at least in part, a presentation of the one or more recommendations based, at least in part, on a reduction of use for one or more other applications, one or more services, or a combination thereof that are similar to the recommended one or more applications, the recommended one or more services, or a combination thereof.

16. The apparatus of claim 9, wherein the activity information includes, at least in part, contextual information, application use information, service use information, device use information, sensor data, or a combination thereof.

17. The method of claim 1, wherein the one or more advancement criteria comprise presence at a given location, a distance travelled, visiting of specific places, participation in specific events, associations and interactions with other users of the one or more services, a rate or amount of usage of the one or more applications and/or the one or more services, a type or mode of usage of the one or more applications, type of service or device, or a combination thereof.

18. The apparatus of claim 9, wherein the one or more advancement criteria comprise presence at a given location, a distance travelled, visiting of specific places, participation in specific events, associations and interactions with other users of the one or more services, a rate or amount of usage of the one or more applications and/or the one or more services, a type or mode of usage of the one or more applications, type of service or device, or a combination thereof.

19. The method of claim 1, wherein the user activity occurs before the user executes the one or more applications, the one or more services, or combination thereof by the device.

20. The apparatus of claim 9, wherein the user activity occurs before the user executes the one or more applications, the one or more services, or combination thereof by the device.

* * * * *